Patented Sept. 30, 1952

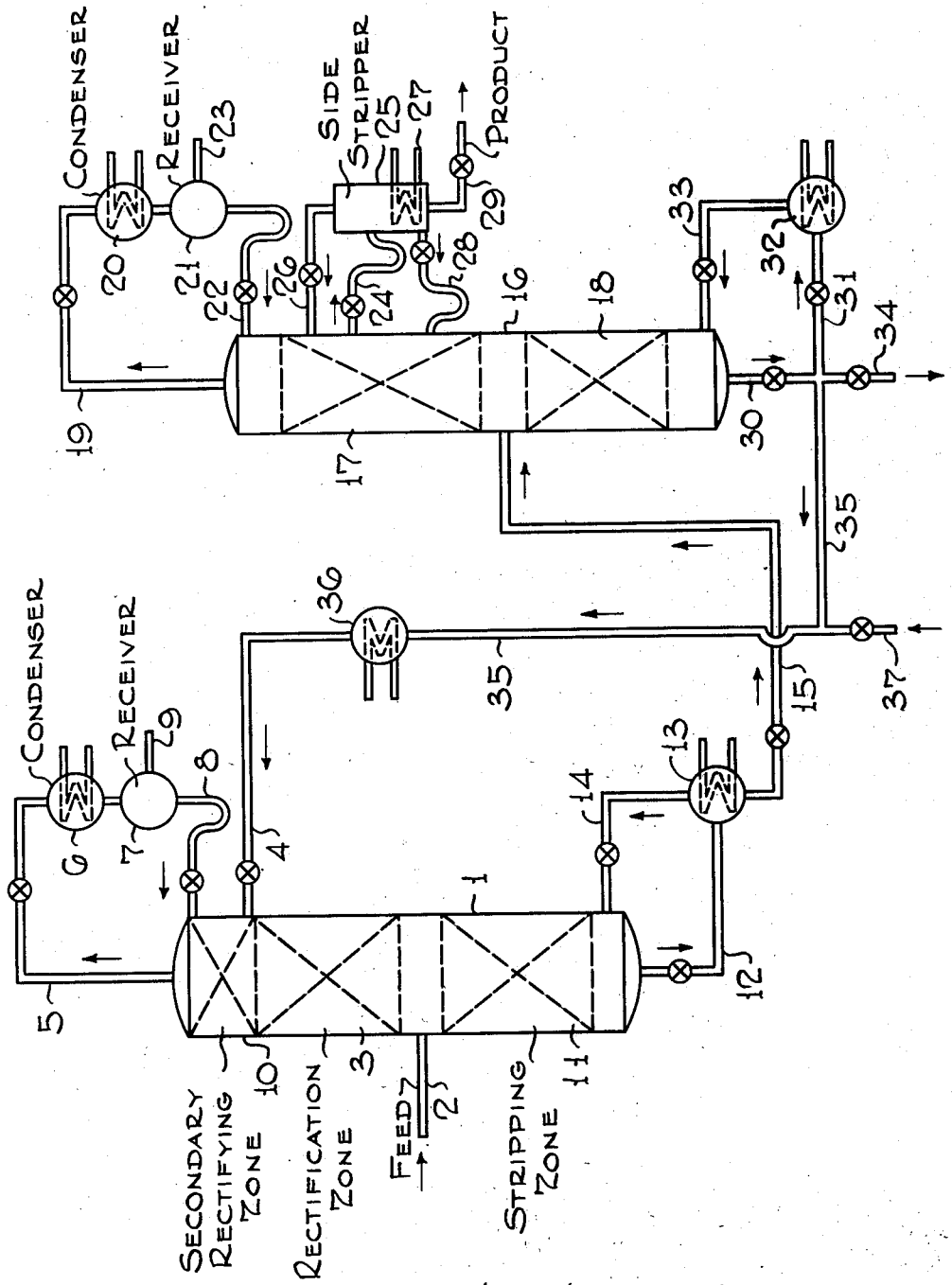

2,612,467

UNITED STATES PATENT OFFICE 2,612,467

EXTRACTIVE DISTILLATION OF ETHANOL CONTAMINATED BY n-PROPANOL

Charles E. Morrell, Westfield, and Carl S. Carlson, Roselle, N. J., and Nat C. Robertson, Corpus Christi, Tex., assignors to Standard Oil Development Company, a corporation of Delaware Application January 14, 1949, Serial No. 70,962

4 Claims. (Cl. 202—39.5)

This invention relates to a purification of ethanol which particularly requires separation of normal propanol and higher alcohols i. e. alcohols of 3–6 carbon atoms among other impurities.

In a number of instances, technical crude ethanol-containing mixtures are contaminated by various impurities that are extremely difficult to separate. Impurities which have given the most difficulty are the mutually water-miscible alcohols and, especially, normal propanol.

The difficulties of separating normal propanol and other impurities from ethanol are increased by the tendencies of these impurities to form close-boiling binary and ternary azeotropes as indicated in the following table:

Table I

| Compounds and Mixtures | Normal B. P., °C. |
|---|---|
| Ethanol-isopropyl ether-water | 60.5 |
| n-Propanol-n-hexane | 65.7 |
| Ethanol-methyl ethyl ketone | 74.8 |
| n-Propanol-methyl ethyl ketone | 77.5 |
| Ethanol-water | 78.1 |
| Ethanol | 78.3 |
| n-Propanol-methyl n-propyl ketone-water | 81.2 |
| n-Propanol-n-propyl acetate-water | 82.2 |

The above list of compounds which is curtailed for the sake of brevity clearly shows how various azeotropes of n-propanol have boiling points between those of ethanol azeotropes and in the neighborhood of the normal boiling points of ethanol, both dry and wet. There are numerous other compounds and constant boiling mixtures which further interfere with the separation of n-propanol from ethanol by ordinary fractional distillation or azeotropic distillation. Such impurities include methanol, tertiary butyl alcohol, aldehydes, esters, ethers, acetals, ketones, ketals and hydrocarbons, in addition to those mentioned.

The separation of all the organic impurities, except methanol, together with n-propanol from the crude ethanol can be accomplished according to the present invention by subjecting the crude mixture to rectification in the presence of a refluxing medium of controlled high water content. This separation may be carried out by subjecting the crude ethanol mixture to a continuous fractional distillation in a column of practical size, including a rectification zone and a stripping zone, with provision for countercurrent liquid-vapor contact in a series of stages under rebiling and refluxing conditions. The liquid flowing through these stages countercurrent to ascending vapors is the internal refluxing medium of controlled high water content obtained by introducing a sufficiently large quantity of water at an upper part of a rectification zone. By maintaining the water content of the internal liquid refluxing medium at a sufficiently high level, the relative volatilities of the organic compounds are modified while condensate of the organic compounds in the rectification zone forms a single homogeneous liquid phase solution with the aqueous refluxing medium both in the rectification zone and stripping zone.

The water concentration required in the internal liquid reflux for essentially assuring that substantially all the n-propanol is volatilized from the internal liquid reflux that retains the ethanol in solution is a minimum of 95 mol per cent. For obtaining satisfactory results on a practical scale for this purpose, 95 to 99 mol per cent of water is required in the internal liquid reflux. In obtaining the critical separation of n-propanol as vapors from the dilute aqueous solution of the ethanol, all other neutral organic compounds, normally boiling in the range from 20° C. to 150° C. except methanol, are also volatilized and separated from the dilute aqueous solution of the ethanol.

Since the efficient operation is essentially continuous, water is added continuously near the top of the fractionating column or upper part of the rectification zone while the crude ethanol feed is continuously passed into the column at the bottom part of the rectification zone or between the rectification zone and the stripping zone. The ethanol feed stream is preferentially introduced at a point where the ratio of the principal organic components in the internal liquid reflux is similar to the ratio of these components in the feed mixture.

Under steady state conditions, the internal liquid reflux having adequately high water concentration for accomplishing the separation of propanol with other neutral organic contaminants other than methanol, tends to have a nearly constant water concentration throughout the rectification zone and, similarly, a uniform water concentration throughout the stripping zone. The ethanol remaining dissolved in the internal reflux flows to the bottom plates of the column and is isolated from the neutral organic contaminants that become distilled overhead. The residual portion of internal liquid reflux withdrawn from a bottom part of the stripping zone is a solution of the aqueous ethanol, the only organic contaminants remaining in the residual internal liquid reflux at the bottom of the stripping zone being any methanol and carboxylic acid contaminants present in the feed.

It is advantageous to have the temperature of the water feed to the upper part of the column close to the temperature of the liquid on the water feed plate, although the water feed temperature may be somewhat lower for partially condensing more vapors ascending to the water feed plate.

A variety of mechanical arrangements may be used for conducting the process and a suitable apparatus is shown schematically in the accompanying drawing.

The drawing illustrates a flow plan of a two-column unit for obtaining separation of ethanol from normal propanol and other neutral organic contaminants other than methanol in a first-column and recovery of purified ethanol from the aqueous dilute solution withdrawn from the first column.

Referring to the drawing, 1 represents the first fractional distillation column provided internally with means for obtaining efficient countercurrent liquid-vapor phase contacting, e. g., such conventional means as bubble plates or packing.

Crude ethanol feed stream is charged to column 1 from an inlet pipe 2 at the bottom of the rectification zone 3. The water to be added continuously in large quantity so as to give the internal liquid refluxing medium a controlled high water content enters column 1 from the water feed line 4 at the upper part of rectification zone 3. Overhead vapors are withdrawn from the top of column 1 through line 5 by which they are passed to cooling condenser 6 to a receiver 7.

A portion of the condensate cooled in receiver 7 is returned to a top part of column 1 as external reflux through line 8. A remaining portion of the distillate is withdrawn from receiver 7 through line 9 to storage or to another unit for further processing, if desired.

A secondary rectifying zone 10 may be provided in the upper part of column 1 between the water feed inlet line 4 and the inlet of the external reflux line 8 so that vapors are further fractionated to approach the composition of aqueous azeotropic mixtures when they are withdrawn overhead by line 5.

The internal liquid reflux, including any unvaporized portions of the feed from inlet 2 flow downwardly from the feed plate in column 1 through the stripping zone 11, which is also provided with conventional means for obtaining liquid-vapor phase contacting. In this stripping zone, a sufficient number of contact stages are provided to strip the liquid reflux of all neutral organic compounds which are rendered more volatile than the ethanol, except any methanol. Finally, the residual liquid reflux reaching the bottom of the stripping zone 11 at the base of column 1 is passed by line 12 to a reboiler 13 for heating by indirect or direct heat exchange with a heating medium, such as live steam. A heated and vaporized portion of the bottoms is recycled from reboiler 13 through line 14 back into the lower part of column 1.

A remaining portion of the bottoms liquid from column 1 is passed through line 15 into the concentrating or dehydrating column 16. Column 16 is equipped in a conventional manner for fractional distillation with liquid-vapor phase contacting means in its rectifying section 17 above the feed inlet and in its stripping section 18 below the feed inlet. An overhead line 19 passes the overhead vapors through a cooling condenser 20 to a receiver 21. A portion of the distillate is returned from receiver 21 by line 22 as external reflux to the upper part of column 16. A remaining portion of the distillate is withdrawn as product from the receiver 21 by line 23.

If the dilute aqueous ethanol bottoms withdrawn from the base of column 1 are contaminated by methanol, the overhead distillate product from column 16 will also be contaminated by methanol and require a further topping to separate the methanol. This topping may be carried out without using an additional column by withdrawing a side stream at the upper part of the rectification section in column 16 through line 24 into a side stripper 25. The side stream of ethanol condensate releases methanol vapors in the side stripper 24 and these vapors may be returned to column 16 through line 26. In the side stripper, the ethanol undergoes reboiling from the heat exchanger 27. A portion of the stripped ethanol is returned as external reflux by line 28 to the column 16 and finished 96% ethanol product freed of methanol substantially pure is withdrawn through line 29.

The dilute aqueous solution which flows down through the stripping section 18 of column 16 is completely stripped of methanol and ethanol in reaching the base of the column. This aqueous bottoms is withdrawn from the base of column 16 through line 30 to be sent partly by line 31 to a reboiler 32 from which heated and vaporized portions of the bottoms are returned to column 16 by line 33. A portion of this aqueous bottoms may be withdrawn from the system through line 34 and a remaining portion may be recycled to the water feed inlet line 4 by line 35 through a heat exchanger 36 for temperature control. Fresh make-up water may be added to the recycled water through line 37. As indicated previously, carboxylic acid impurities and inorganic impurities will tend to remain in the aqueous solution which goes to column 16 and is withdrawn from the bottom of column 16.

Various kinds of equipment, such as pumps, flow meters, temperature and pressure regulators and the like, useful in fractional distillation apparatus may be employed even though omitted from the drawing for the sake of simplicity.

In operating the unit described with an initial crude ethanol feed that contains propanol as a significant impurity, a complete removal of the normal propanol with all other neutral organic contaminants is obtained in column 1 by maintaining the water content of the internal reflux flowing down through the rectification zone 3 and stripping zone 11 of column 1 at concentration levels of the order of 95-99 mol per cent.

Basic data obtained in the application of the process for the separation and purification of ethanol clearly demonstrates that the proper large amounts of water in the internal reflux makes the propanol and associated neutral organic impurities more volatile than the ethanol. Under these conditions, the compounds have different relative volatilities and different volatilities from those existing under ordinary distillation conditions, a non-ideal liquid-vapor phase system being created. The relative volatility is the volatility of one component divided by that of another component, the volatility of each component being proportional to its partial pressure divided by its mol fraction in the liquid phase. With reference to any binary mixture, the relative volatility is defined by the equation $$\alpha = (y_1/y_2)/(x_1/x_2)$$

where $y$ refers to the vapor phase mol fractions of the components and $x$ refers to the liquid phase mol fractions of the components to be separated, the subscript 1 designating the more volatile component and the subscript 2 the less volatile component. Basic experimental data on relative volatilities of components involved in the crude ethanol fractions are given in the following tables:

TABLE I

*Volatilities relative to ethanol, function of water concentration*

| Mol Per cent Water | 95 | 90 |
|---|---|---|
| Component: | | |
| Methanol | 0.6 | 0.70 |
| Ethanol | 1.0 | 1.0 |
| n-Propanol | 1.30 | 1.07 |
| n-Butanol | 1.69 | 1.20 |
| n-Pentanol | 1.68 | 1.25 |
| isopropanol | 1.61 | 1.50 |
| iso-butanol | 2.43 | 1.64 |
| Sec-butanol | 2.01 | 1.68 |
| Pentanol-2 | 2.77 | 1.77 |

The above tabulated data shows how the key separation for obtaining a separation of purified ethanol depends on reversal of volatility of n-propanol at 95 mol per cent water so that the alpha value of n-propanol/ethanol is of the order of 1.3.

TABLE II

*Relative volatilities of n-propanol to ethanol with 95 mol per cent $H_2O$ in liquid phase*

| Equilibrium Plate Mixture | Temp., °C at 1 Atm. | Phase | Components, Mol Percent Binary Basis | | | PrOH to EtOH |
|---|---|---|---|---|---|---|
| | | | $H_2O$ | EtOH | PrOH | |
| 1 | 89.7 | Vapor | 58.5 | 9.0 | 91.0 | 1.22 |
| | | Liquid | 95.2 | 10.8 | 89.2 | |
| 2 | 90.2 | Vapor | 57.2 | 27.6 | 72.4 | 1.23 |
| | | Liquid | 95.1 | 31.9 | 68.1 | |
| 3 | 90.4 | Vapor | 58.2 | 66.0 | 34.0 | 1.29 |
| | | Liquid | 95.2 | 71.5 | 28.5 | |
| 4 | 90.9 | Vapor | 58.9 | 88.0 | 12.0 | 1.31 |
| | | Liquid | 95.2 | 90.6 | 9.4 | |

In Table II is shown how at the critical minimum water concentration in the reflux on each plate throughout the fractionation zone, liquid phase is enriched relatively by ethanol, while the n-propanol is concentrated in the vapor phase.

The complete separation of n-propanol and associated non-alcoholic neutral organic contaminants was demonstrated to be feasible in a continuous fractional distillation column operated in accordance with the principles outlined.

As an example, a continuous fractional distillation column having 30 plates in its rectification zone and 30 plates in its stripping zone was charged continuously with a stream of a crude ethanol cut (69–82° C. boiling range) which included 0.6% methanol, 52% ethanol, 6% isopropanol, 25% normal propanol by weight with about 4% higher $C_4$–$C_5$ alcohols and 13% $C_2$–$C_5$ carbonyl compounds. Concentrations of water between 95 and 99 mol per cent were maintained in the internal reflux by introducing water at a top plate. The crude ethanol cut at room temperature was fed into the midsection of the column. With reasonable external reflux ratios of 20/1 a satisfactory distillation was obtained, a small amount of ethanol being rejected overhead with the distilled contaminants. The separated ethanol recovered as dilute aqueous bottoms was substantially free of any higher boiling alcohol, carbonyl compounds, esters, hydrocarbons, or other neutral organic compounds. A small amount of methanol remained in the dilute aqueous ethanol bottoms and this methanol condensate was stripped in concentrating the ethanol as an aqueous ethanol azeotrope fraction to obtain a purified ethanol product.

Analyses of such operations as set forth in the example showed that by providing an ample stripping section in the fractional distillation zone wherein the ethanol is constantly diluted in the liquid phase by 95 to 99 mol per cent water, the ethanol in the residual internal reflux can be freed of all the neutral organic compounds boiling normally between 20 and 150° C. except methanol, which can be removed easily by stripping afterwards in concentrating the ethanol by azeotropic distillation from its dilute solution.

The water supplied to the upper part of the fractional distillation zone in which the high water concentration is maintained may contain various salts or acids which do not interfere with recovery of pure ethanol by azeotropic distillation after the neutral organic contaminants have been separated. The use and effects of the salt electrolytes in various separations of oxy-organic compounds using the technique of maintaining a high water concentration (above 50 mol per cent) in the internal reflux is set forth and claimed in our copending application, Serial Number 783,989 filed November 4, 1947.

We claim:

1. The method of separating and purifying ethanol from a crude mixture, in which the ethanol is contaminated by normal propanol, which comprises continuously introducing a feed stream of said crude ethanol mixture into an intermediate part of a fractional distillation zone, wherein upflowing aqueous vapors of the normal propanol contact a countercurrent internal liquid reflux having a water content between 95 and 99 mol per cent and a diminishing content of normal propanol as this reflux descends to meet the feed stream, continuously removing a resulting aqueous vapor mixture of the normal propanol overhead from the top of said fractional distillation zone to a rectification zone wherein water is condensed from said aqueous vapor mixture so that the aqueous vapor mixture approaches the aqueous azeotropic composition for the normal propanol as it is passed through said rectification zone and is withdrawn overhead therefrom, continuously refluxing aqueous condensate from said rectification zone to the top of the fractionation zone and introducing a continuous stream of water thereto for maintaining said water content in the internal liquid reflux, and continuously withdrawing from a bottom part of said fractional distillation zone a residual portion of the internal liquid reflux which is a dilute aqueous solution of the ethanol substantially freed of the normal propanol.

2. The method of separating pure ethanol from a mixture containing methanol, isopropanol, and normal propanol, which comprises continuously introducing said mixture as a feed stream into an inlet at an intermediate part of a fractional distillation zone throughout which water concentration between 95 and 99 mol per cent is maintained in liquid phase fractional condensates, diminishing the content of normal propanol and isopropanol in each of said fractional condensates in descending order from the top of the zone to said inlet at the top of said fractional distillation zone, continuously introducing substantially all the liquid water required for maintaining said concentration of water in the liquid phase condensates throughout the upper part of said fractional distillation, passing a resulting aqueous vapor mixture of the normal propanol and isopropanol from the upper part of the fractional distillation zone into a rectification zone wherein an aqueous condensate is removed from said vaporous aqueous mixture, refluxing the aqueous condensate from the rectification zone as part of the water introduced at the top of said fractional distillation zone, withdrawing from an upper part of said rectification zone a remaining distilled aqueous mixture of the normal propanol and isopropanol, withdrawing a residual dilute aqueous solution of the ethanol and methanol from a bottom part of said fractional distillation zone, fractionally distilling an aqueous ethanol azeotrope fraction containing the methanol from said withdrawn residual fraction in a second fractional distillation zone, and stripping methanol from said aqueous ethanol azeotrope fraction.

3. The method of separating purified ethanol from a mixture containing as contaminants n-propanol with neutral non-alcohol organic compounds boiling in the range of 20° C. to 150° C., which comprises continuously introducing a feed stream of the mixture into a mid-section of a fractional distillation zone, supplying adequate water at a top plate of said zone to maintain a water concentration between 95 and 99 mole per cent with a diminishing content of n-propanol in internal reflux descending from the top plate, removing aqueous vapors of said contaminants that pass above said top plate of the fractional distillation zone, condensing a portion of said aqueous vapors into an aqueous condensate and refluxing this aqueous condensate back to the top plate of said fractional distillation zone to form part of the 95 to 99 mole per cent water content of liquids at the top of the fractional distillation zone, stripping out said contaminants from the residual internal reflux passing down through a stripping section of the fractional distillation zone below said mid-section, and withdrawing from a bottom part of the fractional distillation zone the ethanol freed of said contaminants.

4. The method of separating ethanol from an impure ethanol fraction boiling in the range of 69° C. to 82° C., including as chief impurities normal propanol and neutral carbonyl compounds close-boiling therewith, which comprises fractionally distilling said impurities from the impure ethanol fraction in a fractional distillation zone while in contact with a countercurrent aqueous reflux having a water concentration between 95 and 99 mole per cent and having a diminishing content of said impurities as it descends from the top of said zone, supplying water to the top of said fractional distillation zone to maintain said water concentration, maintaining said aqueous reflux at about 89.7° to 90.9° C. under a pressure of about 1 atm. while said impurities are distilled therefrom as an aqueous vapor mixture, condensing from the aqueous vapor mixture of said impurities to form an aqueous condensate, refluxing said water condensate to the top of said fractional distillation zone, and recovering a residual dilute aqueous solution of the ethanol freed of said impurities as a bottoms fraction of the fractional distillation zone.

CHARLES E. MORRELL.
CARL S. CARLSON.
NAT C. ROBERTSON.

REFERENCES CITED

The following references are of record in the file of this patent:

UNITED STATES PATENTS

| Number | Name | Date |
|---|---|---|
| 996,328 | Guillaume | June 22, 1911 |
| 2,990,442 | Metzl | July 21, 1942 |
| 2,551,584 | Carlson et al. | May 8, 1951 |
| 2,551,593 | Gilliland et al. | May 8, 1951 |
| 2,551,626 | Morrell et al. | May 8, 1951 |

OTHER REFERENCES

Schicktanz et al., "Analysis of Fusel Oil by Azeotropic Distillation," Industrial and Engineering Chemistry, Analytical Edition, vol. 11, pages 420–422 (August 15, 1939).